United States Patent Office 3,294,588
Patented Dec. 27, 1966

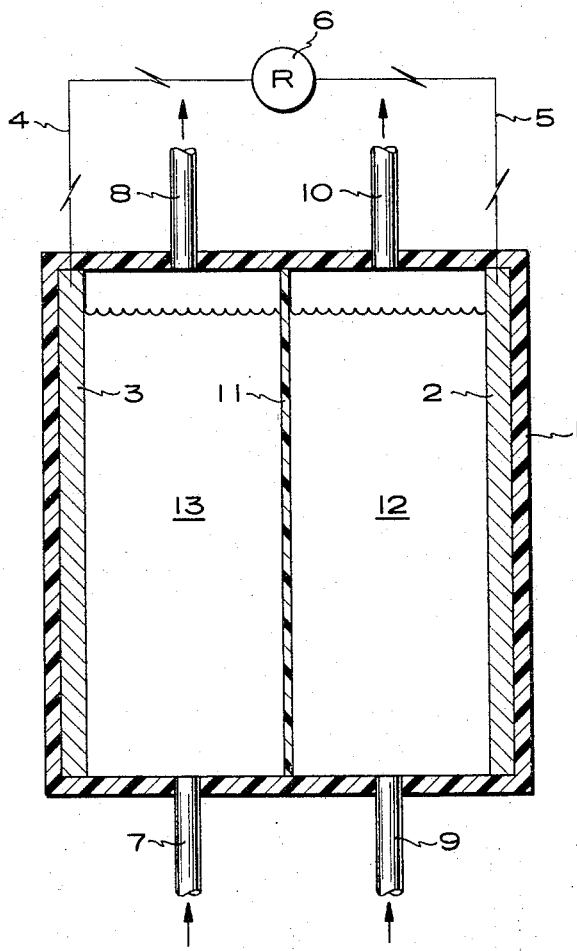
MORTON BELTZER
DUANE G. LEVINE   INVENTORS
BY Olin B. Johnson
PATENT ATTORNEY

3,294,588
METHOD OF OPERATING FUEL CELL WITH ELECTROLYTE CONTAINING QUINONES OR DYES
Morton Beltzer, New York, N.Y., and Duane G. Levine, Colonia, N.J., assignors to Esso Research and Engineering Company, a corporation of Delaware
Filed Apr. 19, 1962, Ser. No. 188,780
3 Claims. (Cl. 136—86)

This invention relates to electrochemical conversion of chemical energy to electrical energy. In particular, this invention relates to a novel fuel cell and to a novel process for the operation of a fuel cell with an organic mediator in the catholyte. More particularly, this invention to fuel cells employing an aqueous catholyte and an organic compound capable of rapidly undergoing reversible oxidation-reduction reactions in solution therewith.

The term "fuel cell" is used herein and in the art to denote a device wherein chemical energy of a conventional fuel is electrochemically converted directly to electrical energy without intermediate conversion to heat at a nonsacrificial or inert electrode. Such cells include at least two nonsacrificial or inert electrodes, functioning as an anode and cathode respectively, which are separated by an electrolyte which provides ionic conductance therebetween, conduction means for electrical connection between such anode and cathode external to such electrolyte, means for admitting a fluid combustible fuel into dual contact with the anode and electrolyte and means for admitting a fluid oxidant into dual contact with the cathode and electrolyte.

Where unrestricted passage of reactants between electrodes is not desirable, the electrolyte compartment is divided into an anolyte compartment and a catholyte compartment by an ion-permeable partition or ion-exchange membrane. Thus, in each such cell a fluid combustible fuel is oxidized at the anode releasing electrons thereto and a fluid oxidant is reduced at the cathode upon receiving electrons from such anode.

This invention is concerned with improving the operation of the cathodic half-cell, i.e. with the reduction of a fluid oxidant at the cathode which is often referred to in the literature as the oxygen or air electrode.

The theoretical potential of a given electrode reaction under defined conditions can be calculated but never completely attained. Imperfections in the system result in a loss of potential to some level below the theoretical potential attainable from such reaction. The difference between observable voltage at a given electrode of an operating half-cell in the course of a given reaction and the theoretical potential of a perfect electrode operating with the same reactant, temperature, pressure and electrolyte constitutes the polarization loss resulting from such imperfections.

Thus, where the cathode is the limiting electrode, the measure of the effectiveness of the cathodic half-cell is therefore the potential that can be maintained at such electrode under a finite current load. In a fuel cell wherein the oxygen of a conventional fuel cell oxidant, e.g. air, hydrogen peroxide, oxygen gas etc., is reduced electrochemically at the cathode there is appreciable polarization when a finite current is drawn from the anode and energy from the cell caused to do work. Providing oxygen at an electrode-electrolyte interface in consistent concentration inhibits the establishment of a definite potential.

It now has been discovered that the presence of certain organic compounds in the catholyte greatly enhances the effectiveness of an oxygen driven cathodic half-cell.

It is therefore one object of this invention to minimize polarization losses at the cathode of a fuel cell by introducing into the catholyte a soluble organic compound that is capable of rapidly undergoing reversible oxidation-reduction reactions and employing a conventional fuel cell oxidant to maintain a sufficient amount of such mediator in its oxidized form to satisfy the electrochemical requirements of the cathode.

It is another object of this invention to provide a fuel cell having an oxygen supplied cathodic half-cell which includes a potential mediator of organic composition to accelerate the establishment and facilitate the maintenance of a definite cathode potential and thus avoid the problems inherent in maintaining a conventional direct oxidant that is irreversibly reduced at the requisite sites of reaction.

The cathodic mediators employed in accordance with this invention are organic compounds that have reversible oxidized and reduced forms both of which are stable under the conditions of reaction employed. The oxidized form must be capable of undergoing rapid electrochemical reduction and the reduced form capable of undergoing rapid chemical oxidation. The rate of reduction, i.e. the rate at which the oxidized form accepts electrons from the cathode, directly limits the rate of power generation of the complete cell. The chemical oxidation of the reduced form must be equal to, and preferably greater than, the rate of reduction to sustain a continuous operation.

The oxidized form is adsorbed on the electrode, reduced and desorbed. An equilibrium is rapidly established at the electrode-electrolyte interface between the oxidized and reduced forms.

The theoretical potential of the cathodic reduction of the chosen mediator should be sufficiently different from the paired anodic reaction to provide a useful difference in potential. The greater this difference of potential the greater will be the capacity of the cell for doing useful work. This difference is preferably in excess of about 0.5 volt or more. The choice of mediator will therefore be somewhat dependent upon the choice of fuel. For instance, where methanol is oxidized at the anode the anodic potential of such half cell in 5% $H_2SO_4$ at 80° F. is about $+0.020$ volt with respect to Standard Hydrogen Reference and a cathodic mediator preferably is chosen that will provide a cathodic potential of about $-0.5$ volt or greater. In the selection of the catholyte, compatibility with the chosen mediator should be considered.

Compounds which are suitable for use as the cathodic mediator of this invention may be selected from the following known reversible organic redox systems:

| Class of Compounds | Oxidized Form Examples | Reduced Form |
|---|---|---|
| Quinones | Quinone | Hydroquinones. |
| Quinone-amines | p-Aminophenol [1] | Aminophenols. |
| Quinone-diamines | p-Phenylenediamine [1] | Phenylenediamines. |
| Indophenol dyes | 2,6 dichlorophenol indophenol | Phenylhydroxylamines. |
| Indamine dyes | Toluylene Blue Bindschedler's Green | Leuco compounds. |
| Oxazine dyes | Gallocyanine | Do. |
| Thiazine dyes | Methylene Blue | Do. |
| Indigoid dyes | Indigo-disulfonate | Do. |

[1] The oxidized form of these hydrolyze to form quinone.

Other compounds such as the Azine dyes, Flavin dyes, etc., can be used but their potential difference from Standard Hydrogen Reference is not sufficient to place these in a preferred list.

Other organic compounds that meet the requirements hereinbefore set forth may also be used.

The accompanying drawing schematically illustrates a simple fuel cell suitable for demonstrating the instant invention. In the drawing, vessel 1 of non-conductive material, e.g. glass, hard rubber, etc., retains cathode 2 and anode 3 which are separated by electrolyte partition 11, e.g. an ion-exchange membrane. Electrolyte partition 11 divides the interior of the cell into a catholyte compartment 12 and an anolyte compartment 13 by sealed connection with vessel 1 by means known in the art. Cathode 2 and anode 3 are metal plates, e.g. platinum-surfaced sheets, that are resistive to chemical reaction with the electrolyte. Anode 3 is surfaced with a suitable anodic fuel cell catalyst, e.g. platinum and iridium. Such catalysts are known in the art and need not be discussed in detail here. Examples of suitable anodic catalysts for either an acid or basic electrolyte include platinum and the platinum comprising catalysts that may include another noble metal, e.g. gold, iridium, etc. A soluble catalyst may also be used in the catholyte to accelerate the air oxidation regeneration of the reduced form. Cathode 2 and anode 3 are electrically connected by wires 4 and 5 and resistance means 6 which is symbolic of any device or appliance powered by direct electric current. Anolyte compartment 13 contains an aqueous electrolyte, e.g. 30 wt. percent $H_2SO_4$, 6 molar KOH, etc., and is provided with a fuel inlet conduit 7 and an exhaust conduit 8 for the escape of carbon dioxide or other gaseous product. A liquid or gaseous fuel that is appreciably soluble in the anolyte is introduced into compartment 13 via conduit 7, e.g. ethylene, methyl alcohol, etc. It should be understood that anode 3 may be modified so as to allow for a flow of an immiscible fuel, e.g. a hydrocarbon, through the electrode so as to contact the anolyte at the anode-anolyte interface. Catholyte compartment 12 contains an aqueous catholyte which may be the same as or different from the anolyte. A mediator of the type hereinbefore described in dissolved in the catholyte. The concentration of the mediator need not be large although relatively high concentrations do not adversely affect operation of the cell. For purely economic reasons the concentration of the mediator will ordinarily be held below about 1 mole per liter although higher amounts can be used. Usually, however, it will be desirable to employ much lower amounts, e.g. in the range of about 0.0001 to 0.3, preferably about 0.001 to 0.03 mole per liter. Catholyte compartment 12 is provided with an oxidant inlet conduit 9 through which air or similar oxidant may be passed into the catholyte to maintain a major amount of the mediator in its oxidized form. Oxidant exhaust conduit 10 provides escape means for excess air, nitrogen, etc. Conduits 7, 8, 9 and 10 may also be used to empty and clean the compartments with which they connect and to introduce fresh electrolyte. Conduit 9 or 10 may be used to introduce additional mediator to compartment 12 if needed.

It should be understood that the mediator can be introduced into the electrolyte in either its reduced or oxidized form since the passage of air through the catholyte will convert the reduced form to the oxidized form. The mediators hereinbefore discussed may be employed at any temperature suitable for operation with an aqueous electrolyte. Although this may be as low as room temperature, it will ordinarily be preferred to operate above about 150° F. and below the boiling point of water, e.g. 160° to 210° F.

The invention will be more fully understood from the following examples which are illustrative and should not be construed as limitations upon the true scope of the invention as set forth in the claims.

*Example 1*

The effect of a soluble, organic mediator in the catholyte upon the performance of the cathode was tested in a simple fuel cell system. Methylene blue was employed as the cathodic mediator. The catholyte employed was aqueous sulfuric acid having an $H_2SO_4$ concentration of about 0.5 mole per liter. The cell was operated at atmospheric pressure and 75° F. The cathode employed was a glass frit having an undercoating of silver and gold upon which platinum black had been electrodeposited. The catalyst was present only on the external surface of the frit. Oxygen was bubbled through the porous frit to the opposing exterior surface where the methylene blue was dissolved in the catholyte. The concentration of methylene blue was changed in successive tests.

The results of these tests are shown in the following table:

TABLE I.—EFFECT OF ORGANIC MEDIATOR IN CATHOLYTE OF FUEL CELL

| Current in Amps./Ft.[2] Cathode Superficial Surface | Polarization [1] in Volts from Theory of $O_2$ Electrode | | |
|---|---|---|---|
| | Methylene Blue Concentration, Moles/Liter | | |
| | 0 | 0.002 | 0.03 |
| 0 | 0.23 | 0.41 | 0.43 |
| 0.5 | 0.53 | 0.69 | 0.65 |
| 1.0 | 0.73 | 0.72 | 0.68 |
| 2.0 | 0.91 | 0.73 | 0.72 |
| 5.0 | (2) | 0.81 | 0.82 |
| 10.0 | (2) | 0.85 | 0.85 |
| 12.0 | (2) | 0.97 | 0.97 |

[1] The term "Polarization" wherever employed in this specification refers to the difference between observed voltage and the voltage of a reversible electrode operating with the same reactant, temperature, pressure, and electrolyte. It does not refer to the difference between observed voltage and open circuit voltage (rest potential).
[2] This level of current was not obtainable with this equipment without the use of a mediator.

The net result was that the mediator caused a five fold increase in the limiting current at this electrode. This performance is considerably increased by using mediators having faster oxidation rates and higher standard potentials which will result in higher limiting currents.

*Example 2*

The procedure of Example 1 is repeated except that in lieu of methylene blue the following mediators are admitted separately to the catholytes of a corresponding number of such cells: Quinone, p-aminophenol, p-phenylenediamine, 2,6-dichlorophenol-indophenol, toluylene blue, Bindschedler's green, gallocyanine and indigo-disulfonate. A control is run without mediator and the polarization loss obtained with the control is greater than it is with each of the above-listed mediators.

The term "combustible fuel" as employed herein refers to hydrogen gas, carbon monoxide and organic compounds including at least one carbon atom and at least one hydrogen atom per molecule, e.g. hydrocarbons, alcohols, aldehydes, carboxylic acids, etc.

The terms "anode" and "fuel electrode" are to be considered interchangeable herein as are the terms "cathode" and "oxygen electrode."

What is claimed is:

1. In a method of operating a fuel cell comprising an anode, an anolyte compartment containing an aqueous anolyte, a cathode compartment containing an aqueous catholyte, fuel transfer means for introducing a fluid fuel into dual contact with said anode and said anolyte, and oxidant transfer means for admitting a fluid oxygen containing oxidant into said catholyte, the improvement which comprises introducing a fluid fuel into dual contact with said anode and said anolyte, admitting an oxygen containing oxidant into said catholyte, and adding to said catholyte a catholyte-soluble organic compound having an oxidized form admitting of electrochemical reduction upon receiving electrons from the cathode and a reduced form admitting of chemical oxidation by said oxidant to said oxidized form, said catholyte-soluble organic compound being selected from the group consisting of quinones, quinone-imines, quinone-diamines, indophenol dyes, indamine dyes, oxazine dyes, thiazine dyes and indigoid dyes.

2. A method as defined by claim 1 wherein said catholyte-soluble organic compound is methylene blue.

3. A method as defined by claim 1 wherein said aqueous catholyte comprises aqueous sulfuric acid.

References Cited by the Examiner

UNITED STATES PATENTS

| | | | |
|---|---|---|---|
| 2,901,522 | 8/1959 | Bopp | 136—86 |
| 3,110,630 | 11/1963 | Wolfe | 136—154 |

OTHER REFERENCES

Status Report on Fuel Cells, PB–151, 804, Dept. of Commerce O.T.S., June 1959, pages 20, 60–64.

WINSTON A. DOUGLAS, *Primary Examiner.*

JOSEPH REBOLD, *Examiner.*

H. FEELEY, A. B. CURTIS, *Assistant Examiners.*